United States Patent
Rhoads

(10) Patent No.: US 6,320,680 B1
(45) Date of Patent: Nov. 20, 2001

(54) STOCHASTIC SCANNING DOCUMENTS TO CHANGE MOIRE EFFECTS

(75) Inventor: Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/099,864

(22) Filed: Jun. 18, 1998

(51) Int. Cl.[7] .................................................. H04N 1/04
(52) U.S. Cl. ......................... 358/497; 358/486; 358/444
(58) Field of Search .................................... 358/497, 494, 358/445, 474, 486, 488, 487, 444; 382/312; 348/219; 310/316, 311, 328; 347/37, 130

(56) References Cited

U.S. PATENT DOCUMENTS

| | | | |
|---|---|---|---|
| 4,689,514 | * 8/1987 | Kondoh et al. | 310/316 |
| 4,743,927 | * 5/1988 | Sasaki | 347/130 |
| 5,335,091 | * 8/1994 | Palum | 358/474 |
| 5,396,142 | * 3/1995 | Koblanski | 358/496 |
| 5,489,994 | 2/1996 | Torok | 358/483 |
| 5,541,741 | * 7/1996 | Suzuki | 358/450 |
| 5,751,444 | * 5/1998 | Ward | 358/471 |
| 5,786,901 | * 7/1998 | Okada et al. | 358/474 |
| 6,115,147 | * 9/2000 | Mizumoto et al. | 358/483 |

* cited by examiner

Primary Examiner—Cheukfan Lee
(74) Attorney, Agent, or Firm—Elmer Galbi

(57) ABSTRACT

An additional motion is introduced into a scanning operation. This additional motion is in addition to the motion that is inherent in any document scanning operation. For example, in a flatbed scanner a linear array of scanning devices is positioned across the document in a first or "x" direction and this array is moved across the document in a perpendicular or "y" direction. In a flatbed scanner the position of the scanning devices are fixed in the "x" direction. In a drum scanner a light beam moves across the document in an "x" direction and the document is moved in the "y" direction. The light reflected from the document is directed to a fixed photoreceptor. With the present invention an additional vibratory motion is introduced into the scanning process. With a flatbed scanner the array of detector devices is moved or vibrated. The vibratory motion can for example be in the "x" direction. With a drum scanner the photoreceptor is moved or vibrated. For example the photodetector can be moved or vibrated in the "x" direction. The amount and direction of the vibratory movement can vary up to about one half the distance between units in the scanner's resolution (i.e. one half a pixel). If one is trying to eliminate Moiré patterns the vibratory movement can be a pseudo random series of movements. If one is trying to introduce a special pattern into the document or to otherwise create special effects, various other type of motion can be used. Movement of the CCD array in a flatbed scanner or movement of the photoreceptor in a drum scanner can be done by a simple piezo electric transducer or by a simple mechanical cam.

16 Claims, 5 Drawing Sheets

FIG. 4

| COLUMN | A | B | C | D | E | F | G | H | | | | |
|--------|---|---|---|---|---|---|---|---|---|---|---|---|
| ROW | | | | | | | | | | | | |
| A | A,A | A,B | A,C | A,D | A,E | A,F | | | | | | |
| B | B,A | B,B | B,C | B,D | B,E | | | | | | | |
| C | C,A | C,B | C,D | | | | | | | | | |
| D | | | | | | | | | | | | |
| E | | | | | | | | | | | | |
| F | | | | | | | | | | | | |
| | | | | | | | | | | | | |
| | | | | | | | | | | | | |
| | | | | | | | | | | | | |
| | | | | | | | | | | | | |

FIG. 5

STOCHASTIC SCANNING DOCUMENTS TO CHANGE MOIRE EFFECTS

FIELD OF THE INVENTION

The present invention relates to document scanning and more particularly to a method and apparatus for changing the Moiré effects introduced by conventional scanning apparatus.

BACKGROUND OF THE INVENTION

Existing document scanners can generally be classified as either flatbed scanners or drum scanners. Flatbed scanners generally have a linear array of detecting devices such as linear charge coupled devices (CCDs). The space between the detecting devices determines the horizontal resolution of the scanning device. The speed that the array is moved along the document and the rate at which the devices are read, determines the vertical resolution of the scanning device. Flatbed scanning devices which have 300 to 600 CCD elements per inch are commercially available.

Drum scanners generally have a single photo-detector and a scanning beam of light. The beam of light scans across a line of the document as the document moves around the drum. The light reflected from the document is directed to the single photodetector. The horizontal resolution of the scanner is primarily determined by the frequency that the output of the single photoreceptor is sampled as the light beam moves across a line of the document.

Drum scanners can also include a linear array of detectors and there are many different types of scanners which combine elements from the above described two general types of scanners.

Scanning a document at a particular resolution (for example at 600 pixels per inch) can introduce patterns into the data. The patterns introduced into data by scanning appear when the scanned data is printed or displayed. Such patterns are frequently referred to as Moiré patterns.

In some instances special patterns are intentionally introduced into an image so that when the image is scanned and then reproduced the Moiré patterns produce visible images. When such images are visible it indicates that a document is not an original, that is, the image was created by scanning an original. Such technology is well developed and is for example described in issued U.S. Pat. No. 5,735,547.

The present invention is directed to a method and apparatus for scanning a document in a manner which changes how and whether Moiré patterns are introduced into an image when the image is scanned.

SUMMARY OF THE INVENTION

With the present invention an additional motion is introduced into the scanning operation. This additional motion introduced by the present invention is in addition to the motion that is inherent in any document scanning operation. For example, in a flatbed scanner a linear array of scanning devices is positioned across the document in a first or "x" direction and this array is moved across the document in a perpendicular or "y" direction. In a flatbed scanner the position of the scanning devices are fixed in the "x" direction. In a drum scanner a light beam moves across the document in an "x" direction and the document is moved in the "y" direction. The light reflected from the document is directed to a fixed photoreceptor. With the present invention an additional vibratory motion is introduced into the scanning process. With a flatbed scanner the array of detector devices is moved or vibrated. The vibratory motion can for example be in the "x" direction. With a drum scanner the photoreceptor is moved or vibrated. For example the photodetector can be moved or vibrated in the "x" direction. The amount and direction of the vibratory movement can vary up to about one half the distance between units in the scanner's resolution (i.e. one half a pixel). If one is trying to eliminate Moiré patterns the vibratory movement can be a pseudo random series of movements. If one is trying to introduce a special pattern into the document or to otherwise create special effects, various other type of motion can be used. Movement of the CCD array in a flatbed scanner or movement of the photoreceptor in a drum scanner can be done by a simple piezo electric transducer or by a simple mechanical cam.

With the present invention, the data generated by the vibrated scanning device can be manipulated to generate a digital image similar to that which would be generated by a normal scanning element, except that the digital image so generated does not contain the majority of the Moiré patterns that would have been generated by a normal scanning element. The data from the vibrated scanning element can also be manipulated to enhance certain desired effects. That is, the present invention can be used to enhance patterns that are intentionally placed in an image. For example, an image can be constructed so that it will contain a pattern that will only be visible if the image is scanned with a scanner which is operating in accordance with the present invention.

BRIEF DESCRIPTION OF THE DRAWINGS

FIG. 4 shows the location on a document of the pixels from the scanning element.

FIG. 5 shows how the data from the scanner is combined.

DETAILED DESCRIPTION

Figure 1:
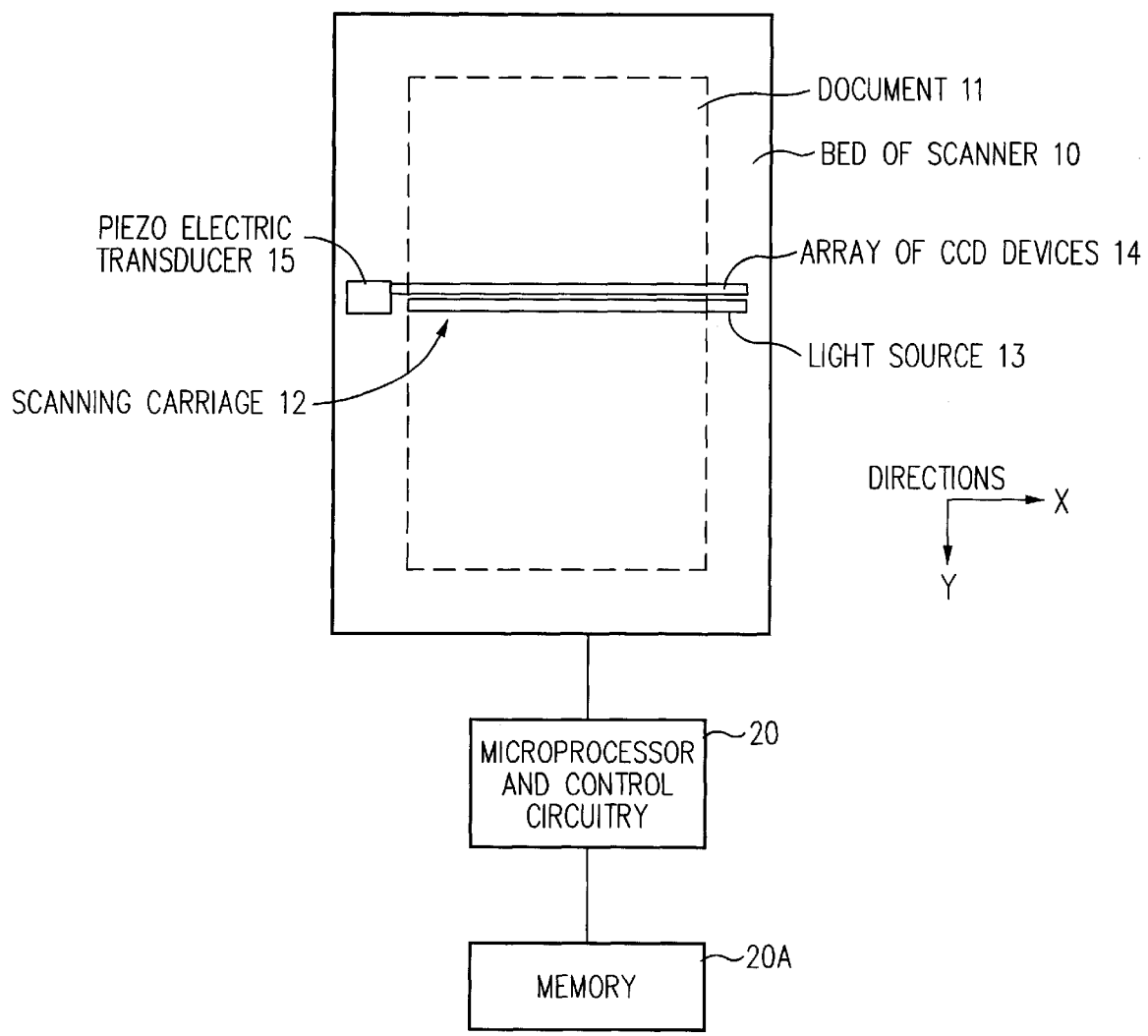
FIG. 1 is an overall diagram of a scanning system which utilizes the present invention.
Figure 2A:
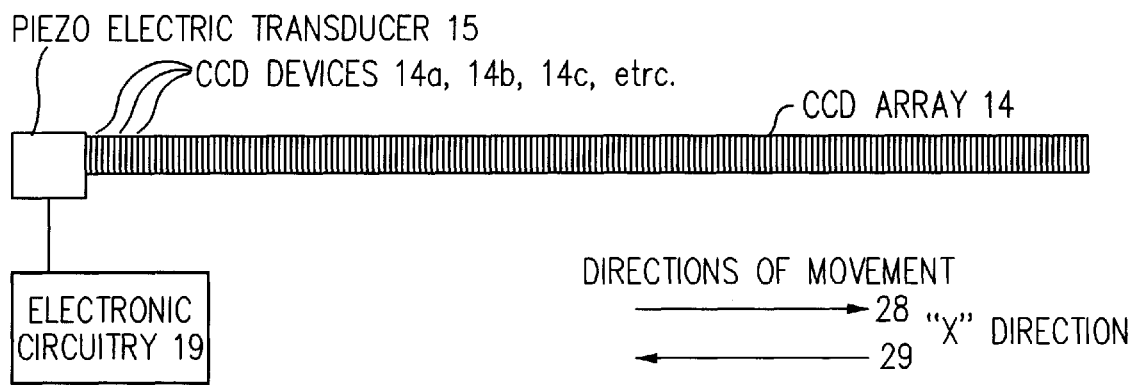
FIGS. 2A and 2B are diagrams showing how the CCD scanning array and the piezo electric transducer are mounted on the frame.

An overall diagram illustrating the present invention applied to a flatbed scanner is shown in FIG. 1. The scanner shown in FIG. 1 has a scanner bed 10 on which is positioned a document 11. A moveable scanning carriage 12 contains a light source 13 and a linear array of charge coupled devices (CCDs) 14. A line on the document 11 is illuminated by LED light source 13. An image of the illuminated line is focused on CCD detector array 14 by a lens (not explicitly shown). The array 14 is moved across the document in the y direction (by a conventional mechanical mechanism which is not explicitly shown in the drawing). A microprocessor 20 controls the operation of the entire system and signals from the CCD array 14 are stored in memory 20A. As the system scans a document 11 the signals from array 14 creates a digital image of the document in micro-processor memory 20A. All of the above elements are conventional and they are found in many commercially available flatbed scanners. The present invention involves transducer 15 which is positioned at the end of array 14 and which will be described later with reference to FIGS. 2A and 2B.

Figure 3:
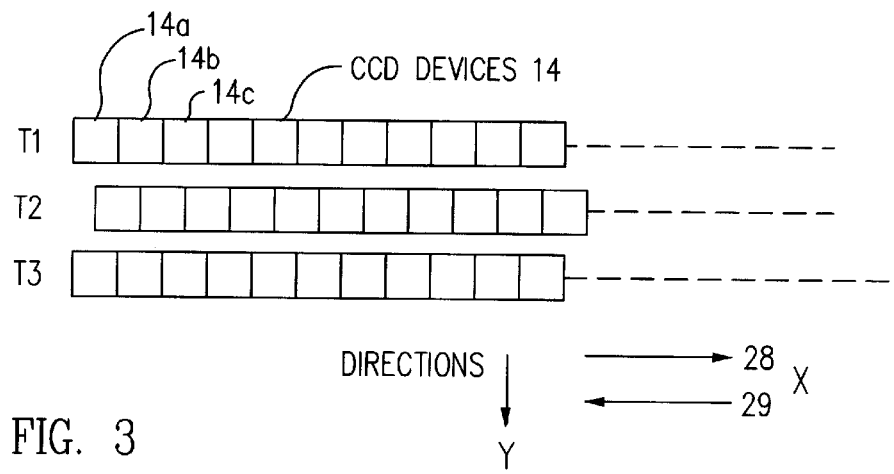
FIG. 3 shows the scanning array in a series of different positions.
Figure 3A:
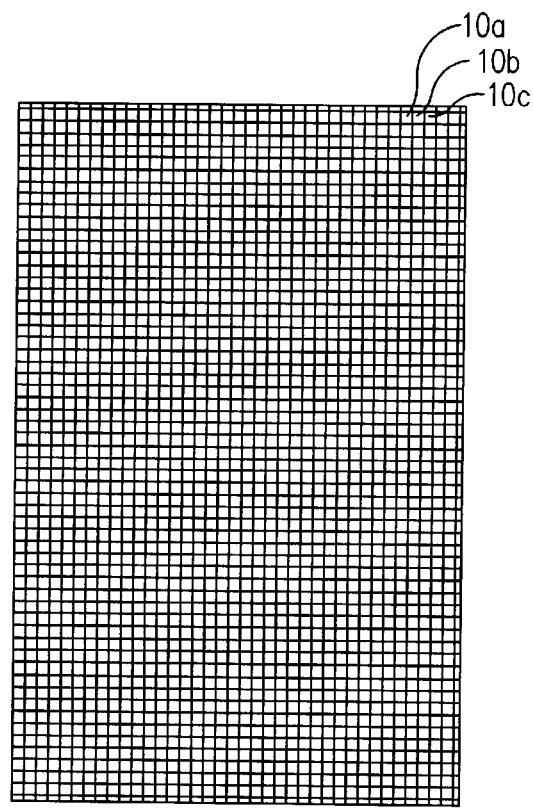
FIG. 3A illustrates the pattern of pixels created by a scanner which does not utilize the present invention.

FIG. 3A illustrates the image of document 10 which would be created in memory 20A if the system operated in a conventional manner without the present invention. The image has pixels 10a, 10b, 10c, etc. arranged in uniform rows and columns. The memory 20A stores a number for each pixel which indicates the intensity of that pixel. For completeness it is noted that a color scanner would store three numbers for each pixel to indicate the intensity of each of the tree primary colors in each pixel. The preferred embodiment of the invention will be described as a single color (i.e. a black and white) scanner. However, the invention can be extended to a color scanner by handling each color in the same manner that a single color is handled in the embodiment described herein.

Figure 2B:
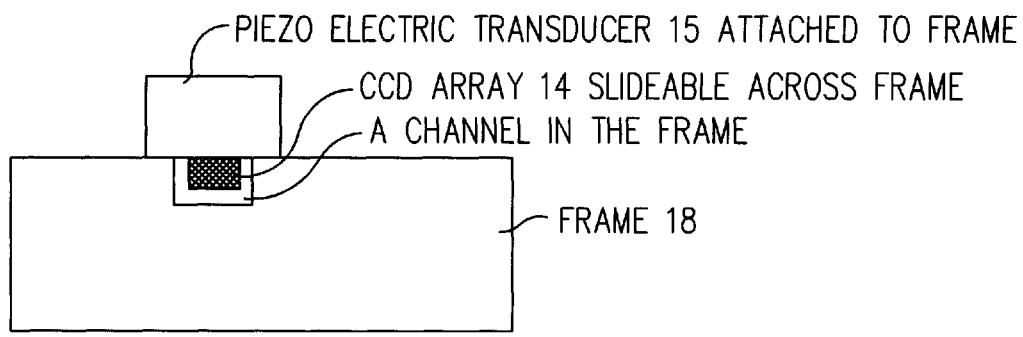

The speed at which the array 14 is moved in the "y" direction and the rate at which the CCD devices 14 are read must be coordinated. For example in a scanner which is designed to create an image with 600 pixels per inch, if the time required for the array 14 to move 1/600th of an inch is one millisecond, a reading must be taken from the CCD elements in array 14 each millisecond. That is, the rate at which data is read from CCD devices in array 14 must be coordinated with the speed that the array 14 is moved in the "y" direction so that a new row of pixels is in position to be read each time the CCD elements in array 14 are read. Scanners which produces the type of image illustrated in FIG. 3A are commercially available. The difference between the present invention and the prior art relates to the transducer unit 15 which moves or vibrates the array 14 in the "x" direction. As shown in FIG. 2 the CCD scanning array 14 has a large number individual CCD devices 14a, 14b, 14c etc. One end of the scanning array 14 is attached to transducer unit 15 which may be a piezo electric crystal . As shown in FIG. 2B, the piezo electric transducer 15 is attached to stationary frame 18. The array of CCD devices is free to move in the x direction (i.e. directions 28 and 29) by sliding in a channel or grove in frame 18. When a voltage is applied to piezo electric transducer 15 by electronic circuitry 19, the piezo electric transducer 15 expands and the CCD scanning array 14 moves in the direction 28. When the voltage is removed from the piezo electric transducer, the array 14 moves in direction 29 back to its original position.

In the first embodiment of the invention described herein the scanning array 14 is moved in the x direction (i.e. in directions 28 and 29) by an amount equal to one half a pixel size each time a row of pixels is read. The sequence of steps is:

a) The first row of pixels is read,
b) The scanning element is moved to the right (direction 28) by one half a pixel,
c) The second row of pixels is read,
d) The scanning element is moved to the left (direction 29) by one half a pixel, and
e) The second row of pixels is read.

The sequence is then repeated. FIG. 3 shows the position of CCD scanning array 14 at three different times T1, T2, and T3. It is noted that in FIG. 3, the CCD devices 14a, 14b, 14c, etc. are shown in an expanded view and thus all of the elements in array 14 can not be shown on the figure. It should also be noted that the movement of the array 14 in the "y" direction along the document is in fact continuous and the positions discussed here are the positions of the array at the specific times that the CCD devices are sampled or read. At time T1, the scanning array 14 is in what will be called the "home" position. After the value is read from the CCD devices in the home position, the array 14 moves one pixel position in the "y" direction and the array 14 is moved one half a pixel position in the "x" direction 28. A second set of values is then read from the CCD devices 25 Next the array moves one more pixel position in the "y" direction and the array 14 is moved one half a pixel position back to the home position. The process is then repeated.

FIG. 4 shows the document 11 with an indication of the location of the pixels that are read by CCD elements 14a, 14b, 14c, etc. It is noted that the edge portions of the document are ignored and only the information in the area designated by line 41 is of interest. It is also noted that since the document is shown enlarged in FIG. 4, only the top left corner of the document is shown.

The pixels in each row of the document are designated as by two numbers. The first number indicates the row where the pixel is located and the second number indicates the position of the pixel in the row. Thus the third pixel in the second row is designated as "2,3".

FIG. 5 illustrates the data in memory 17 which represents the data from area 41 of document 11. FIG. 5 represents an array of numbers stored in a memory in a conventional manner to represent an image. The images are arranged in rows and columns. Two letters are used to represent each number. For example "B,C" represents the third number in the second row. The number "B,C" is a number stored in memory 20A which represents the value of a particular pixel in the image.

The values represented in FIG. 5 are calculated from the values read from the CCD devices as they scan each of the pixels shown in FIG. 4. The values in the first row are the direct values read from the scanning elements. For example value "A,B" is the value read from a CCD element as it scans pixel "1,3" shown in FIG. 4. The values in row B are calculated values. For example value "B,A" is derived from the values read from the CCD elements as they scan pixels "2,1" and "2,2". The value of "B,A" is one half the value of "2,1" plus one half the value of "2,2". The reason for this is that the value "B,A" represents a pseudo pixel that is located half way between pixels "2,1" and "2,2". Each of the other values for the values in rows 2, 4, 6, etc. are calculated in like fashion.

From a physical point of view, a first set of values is read when the scanning array 14 is in position shown in T1 in FIG. 3. Next the array 14 is moved in the "y" direction by an amount equal to one pixel position and the scanning array 14 is moved one half a pixel position in the "x" direction 28 and a second set of values are read from the scanning array 14. The process then continues as previous explained. If the values read as described above were directly printed, on a conventional printer, the image would be distorted, since a printer prints the value of the pixels in the second row of an image directly beneath and aligned with the pixels in the first row of an image.

The above distortion which would occur due to the fact that the scanning array is moved between rows of pixels in an image is what necessitates the calculation of "pseudo" pixels as previously described.

In the simplified embodiment of the invention described above, the calculation of he value of the pseudo pixels is relatively easy since the scanning element is moved a uniform one half pixel amount between each scan row. In the preferred embodiment of the invention shown in FIG. 6 and described below, the calculation becomes somewhat more complicated.

Figure 6:
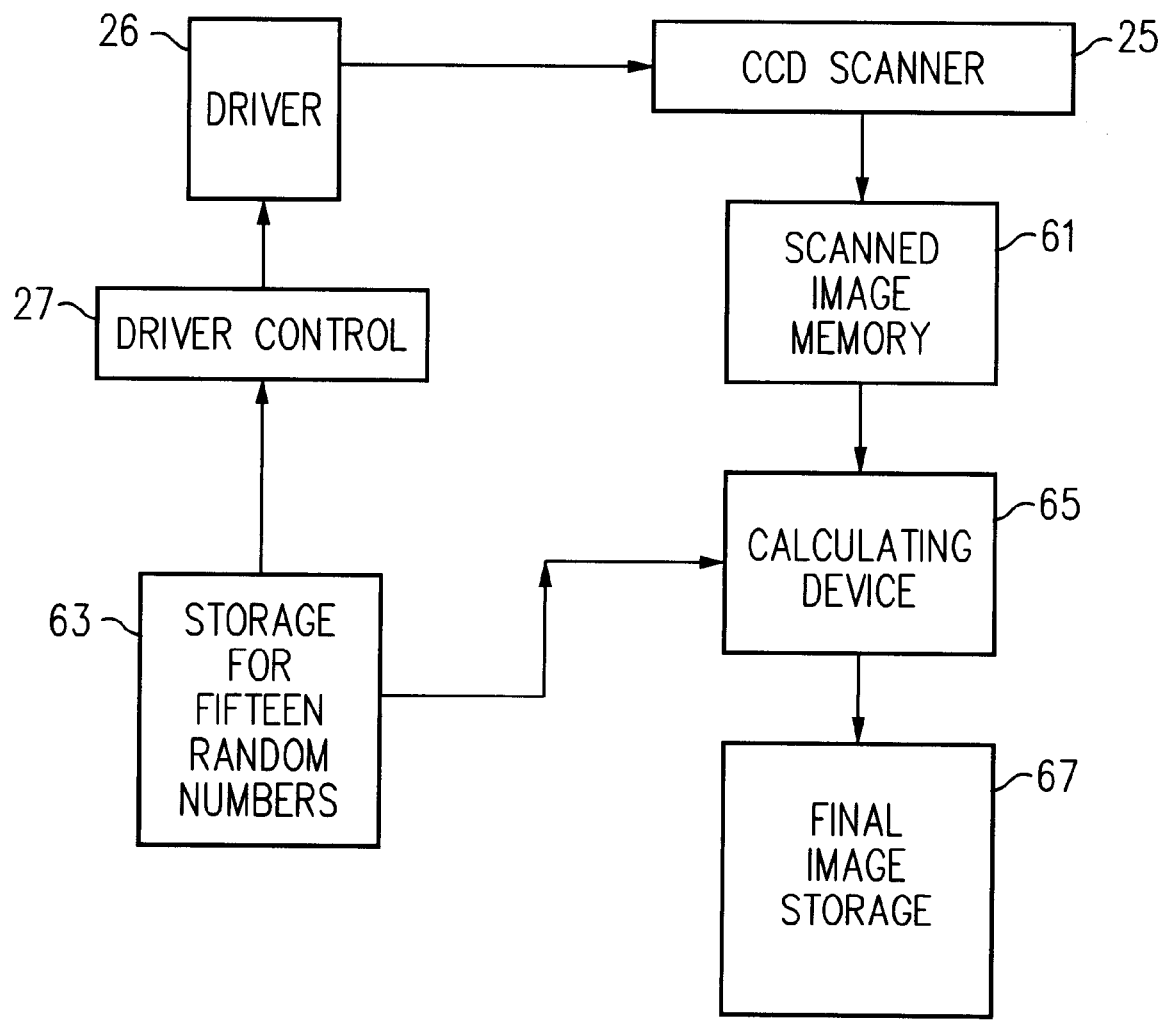
FIG. 6 shows a preferred embodiment of the invention.

In the preferred embodiment of the invention shown in FIG. 6, the scanning element 25 is moved in accordance with a pseudo random pattern. As shown in FIG. 6, the pseudo random pattern has fifteen different values between 10 and 90 percent. Each value represents the percent of the width of a pixel which the scanning element is moved during a particular time period. For example the scanner might be moved by the following amounts over fifteen rows of pixels:

| | |
|---|---|
| T1 | .27% of a pixel |
| T2 | .12% of a pixel |
| T3 | .60% of a pixel |
| T4 | .19% of a pixel |
| T5 | .15% of a pixel |
| T6 | .19% of a pixel |
| T7 | .22% of a pixel |
| T8 | .59% of a pixel |
| T9 | .00% of a pixel |
| T10 | .62% of a pixel |
| T11 | .25% of a pixel |
| T12 | .02% of a pixel |
| T13 | .39% of a pixel |
| T14 | .75% of a pixel |
| T15 | .78% of a pixel |

The above series of numbers is merely intended as an example. The mathematics for generating a series of pseudo random numbers is well developed. While in general the above numbers will provide satisfactory results, in various applications other series with more or less numbers and series generated with other random number generators may be better. The particular numbers used is a matter of choice for each particular application.

A system which utilizes a series of random numbers to determine the amount of movement between rows of pixels is shown in FIG. 6. The CCD scanner 25 and the driver 26 are similar to the previous embodiment. The series of numbers which specify the amount of movement are stored in memory 63. A driver control 27 reads the numbers from memory 63 and sequentially activates the driver 26 with signals which have a magnitude controlled by the numbers in storage 63. The output of the scanner goes to memory 61. The calculating device 65 combines the values from memory 61 into a final image based upon the amount of movement of each line.

In the previous example where the scanning element was moved one half of a pixel, the numbers in the final image was calculated by taking one half of the value of two pixels. In the situation described in the present embodiment the calculation is somewhat more complicated. For example if the movement is 0.25 of a pixel, the final value of a pixel would be calculated by taking 0.25% of the value of one value and .75% of another value.

The diagram shown in FIG. 6 shows a number of discrete components. it should be recognized that the components shown in FIG. 6, could be discrete components; however, they could also be subroutines and area of memory in a single conventional computer.

The present invention can also be used to enhance patterns which are intentionally place in an image. That is, the present invention can be utilized to detect special patterns which are placed in an image and which can only be detected by a scanner which operates according to the present invention As a simplified example consider an image which is printed at 1000 pixels per inch and which is scanned at 750 pixels per inch. Consider that the pixels in the image are printed in the pattern given below. In the following lines the numbers "9" and "6" indicate the intensity of a pixel. The underlining is only added to emphasize the pattern of the pixels.

```
6996699669966996699669966996699669966996699669966996
6996699669966996699669966996699669966996699669966996
6996699669966996699669966996699669966996699669966996
```

With a conventional scanner, each scanned pixels would cover three of the original pixels and have one of the following values (where the numbers "24" and "21" indicate the values of the scanned pixels. The underlining shows the pixels in the original that are grouped together in the scanned pixels.:

```
6996699669966996699669966996699669966996699669966996
 24 21 21 24 24 21 21
6996699669966996699669966996699669966996699669966996
  24 24 21 21 24 24
6996699669966996699669966996699669966996699669966996
   21 24 24 21 21
```

The above shows each scanned lines. With a conventional scanner the lines which appear beneath each other would be as follows for each of the above examples:

| | | | | | | |
|---|---|---|---|---|---|---|
| 24 | 21 | 21 | 24 | 24 | 21 | 21 |
| 24 | 21 | 21 | 24 | 24 | 21 | 21 |
| 24 | 21 | 21 | 24 | 24 | 21 | 21 |
| 24 | 21 | 21 | 24 | 24 | 21 | 21 |
| or | | | | | | |
| 24 | 24 | 21 | 21 | 24 | 24 | |
| 24 | 24 | 21 | 21 | 24 | 24 | |
| 24 | 24 | 21 | 21 | 24 | 24 | |
| 24 | 24 | 21 | 21 | 24 | 24 | |
| or | | | | | | |
| 21 | 24 | 24 | 21 | 21 | | |
| 21 | 24 | 24 | 21 | 21 | | |
| 21 | 24 | 24 | 21 | 21 | | |
| 21 | 24 | 24 | 21 | 21 | | |

With the present invention, where the scanner is shifted two pixels the right after the first row and then shifted back left after the second row, the patterns would be as follows:

| | | | | | | | |
|---|---|---|---|---|---|---|---|
| 24 | 21 | 21 | 24 | 24 | 21 | 21 | |
| 24 | 24 | 21 | 21 | 24 | 24 | 21 | 21 |
| 24 | 21 | 21 | 24 | 24 | 21 | 21 | |
| 24 | 24 | 21 | 21 | 24 | 24 | 21 | 21 |
| or | | | | | | | |
| 24 | 24 | 21 | 21 | 24 | 24 | | |
| 21 | 24 | 24 | 21 | 21 | 24 | 24 | |
| 24 | 24 | 21 | 21 | 24 | 24 | | |
| 21 | 24 | 24 | 21 | 21 | 24 | 24 | |
| or | | | | | | | |
| 21 | 24 | 24 | 21 | 21 | | | |
| 21 | 21 | 24 | 24 | 21 | 21 | | |
| 21 | 24 | 24 | 21 | 21 | | | |
| 21 | 21 | 24 | 24 | 21 | 21 | | |

As can be seen from the above only every third column has identical values in a vertical row, where with a conventional scanner, each vertical row was identical. When a printed image of the above is viewed, it would have a different appearance to the viewer.

It is noted that the above is a very simple example to illustrate the principle involved. The same principle could be used with a much more complicated pattern. Likewise the above illustration is given in terms of the first simplified embodiment of the invention.

The same technique could be used with the preferred embodiment of the invention where the scanner is shifted in a more complicated pattern.

The above described technique can be used to facilitate the determination if documents are originals or copies. Using the above technique a pattern can be printed in a document which can only be detected by a scanner which has an array of elements that moves in a particular patterns. If such a document is scanned on a conventional scanner and then reproduced, the intensity of the hidden image will be reduced or destroyed.

The invention has been described with respect to single color black and white scanner. The invention could be similarly applied to a color scanner. A color scanner generally has three rows of detectors, one for each color. These detectors could all be moved together in the "x" direction or more complicated patterns could be created by moving the detectors for each pattern in accordance with a different pattern of movement.

It is noted that the present invention may not entirely eliminate Moiré patterns in all instances. However on a stochastic basis the present invention will minimize Moire patterns in most conventional images.

In the embodiment described herein, the detector elements are moved in the "x" direction while the document is canned in the "y" direction. In certain applications it may be desirable to move the detector elements in a direction other than in the "x" direction.

The mechanism for moving array 14 in a ""y" direction can be conventional. For example the array 14 could be mounted on rollers and spring biased to move in one "y"" direction. An electric motor with a small cable could pull the array 14 against the spring bias in order to move the array over an document during the scanning operation.

While the invention has been shown and described with respect to preferred embodiments thereof, it will be understood by those skilled in the art that various changes in form and detail may be make without departing from the spirit and scope of the invention.

I claim:

1. In a scanner which scans documents by moving a linear array of detectors over a document in a first direction, at least some of the detectors in said array each covering a particular distance, the improvement which comprises vibrating said linear array of detectors in a direction perpendicular to said first direction with a pre-determined pseudo random pattern of motion, detecting signals from said detectors to generate an image with pixels each having a width equal to said particular distance, whereby Moiré patterns are reduced.

2. The device recited in claim 1 wherein said vibration has an amplitude less than one half the width of one of said detectors.

3. A scanner which includes a linear array of detector elements each of which generates output signals, at least some of said detector elements each having a width equal to a first value, means for moving said array over said document in a pre-determined pseudo random pattern of motion in a first direction, means for moving said array of detectors in a direction perpendicular to said first direction, means for combining the output signals from said detectors to generate a square array of pixel values which represent an image, each pixel having a size equal to said first value, whereby Moiré patterns in the said image are reduced.

4. A scanner which includes a linear array of detector elements each of which generates output signals, the distance between center points of said detector elements being equal to a first value, a device for moving said array over said document in a direction "y", a transducer for moving said array of detectors in a direction "x", direction x being perpendicular direction "y", a computational device for combining the output signals from said detectors to generate a square array of pixel values which represent an image, said pixels having a pixel pitch equal to said first value, whereby Moiré patterns in the said image are reduced.

5. In a scanner adapted to scan documents by moving a linear array of charge coupled devices (CCDs) over a document in a first direction, the improvement which comprises vibrating in accordance with a pre-determined pseudo random pattern said linear array of CCDs in a direction perpendicular to said first direction in order to reduce Moiré patterns.

6. The method of scanning a document which consists of a series of rows of areas with a linear array of detectors, the distance between the center points of said detectors equaling a first value, said rows being arranged in a direction "y", said method comprising, positioning said detectors over a first row of said document, reading the value of the output of said detectors to generate output signals, moving said detectors over a second row of said document and also moving said detectors in a direction "x", direction "x" being perpendicular to said direction "y", repeating said positioning, reading and moving steps until said entire document has been scanned a computational device for combining the output signals from said detectors to generate an image with pixels, the pixel pitch of which equal said first value.

7. The method recited in claim 6 wherein said movement in said direction perpendicular to said first direction is done in pseudo random amounts.

8. In a scanner which scans documents by moving a linear array of detectors over a document in a first direction, each of said detectors covering a first distance, the improvement which comprises means for vibrating said linear array of detectors in a direction perpendicular to said first direction, said vibration being in accordance with a pseudo random pattern of motion, and generating an image from said detectors which has pixels values equal to said first distance, whereby Moiré patterns are reduced.

9. The device recited in claim 8 wherein said vibration follows a pseudo random pattern of motion.

10. The device recited in claim 8 wherein said vibration has an amplitude less than one half the width of a scanning element.

11. A flatbed scanner for documents, said scanner including a linear array of detectors which is moved over the length of said document, the length of said linear array at least equaling the width of said document, each of said detectors covering a first distance, means for vibrating said linear array in a direction perpendicular to the length of said document, said vibration being in accordance with a pseudo random pattern of motion, means for generating an image which has a pixel size equal to said first distance from the output of said detectors, whereby Moiré patterns are reduced.

12. The scanner recited in claim 11 wherein said means for vibrating includes a piezo electric crystal.

13. The scanner recited in claim 11 wherein said vibration is according to a pseudo random pattern.

14. The device recited in claim 11 wherein said vibrator movement has an amplitude less than one half the width of a scanning element.

15. A method of scanning a document including moving a linear array of detectors over the length of said document, the length of said linear array at least equaling the width of said document, said detectors each having a width "x", vibrating said linear array in a direction perpendicular to the length of said document, said vibration being in accordance with a random pattern of motion, generating an image with a pixel pitch "x" from the output of said detectors, whereby Moiré patterns are reduced.

16. The method recited in claim 15 wherein the magnitude of said vibration is less than one half the width of one of said detectors.

* * * * *